United States Patent
Travis et al.

(10) Patent No.: US 9,317,237 B2
(45) Date of Patent: Apr. 19, 2016

(54) SYSTEM AND METHOD FOR AUTOMATED DIGITAL RFID PRINTING AND INTEGRATION

(71) Applicant: Avery Dennison Corporation, Mentor, OH (US)

(72) Inventors: Neil Travis, Cheshire (GB); Karen Willingham, Greensboro, NC (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 14/583,990

(22) Filed: Dec. 29, 2014

(65) Prior Publication Data

US 2015/0227326 A1 Aug. 13, 2015

Related U.S. Application Data

(60) Provisional application No. 61/939,379, filed on Feb. 13, 2014.

(51) Int. Cl.
*G06F 3/12* (2006.01)
*B41J 3/50* (2006.01)
*G06K 17/00* (2006.01)
*H04N 1/32* (2006.01)

(52) U.S. Cl.
CPC ............... *G06F 3/1288* (2013.01); *B41J 3/50* (2013.01); *G06F 3/1203* (2013.01); *G06F 3/1244* (2013.01); *G06F 3/1275* (2013.01); *G06F 3/1282* (2013.01); *G06K 17/0025* (2013.01); *H04N 1/32138* (2013.01)

(58) Field of Classification Search
CPC ... G06F 19/3456; G06F 21/35; G06F 21/608; G06F 2221/2105; G06F 17/2247; G06F 17/227; G06F 3/1204; H04N 1/00342; H04N 1/00846; H04N 1/00875; H04N 2201/3226; H04N 2201/3246; H04N 2201/3274
USPC ......... 358/1.15, 1.14, 1.1, 539; 707/E17.127, 707/999.101; 715/205, 234, 274; 340/10.1
See application file for complete search history.

(56) References Cited

U.S. PATENT DOCUMENTS

| | | | | |
|---|---|---|---|---|
| 7,273,165 B2 * | 9/2007 | Satake et al. | | 235/375 |
| 7,333,001 B2 * | 2/2008 | Lane et al. | | 340/10.1 |
| 7,868,738 B2 * | 1/2011 | Dasgupta et al. | | 340/10.32 |
| 7,936,252 B2 * | 5/2011 | Donato | | 340/10.51 |
| 8,185,235 B2 * | 5/2012 | Krener et al. | | 700/229 |
| 8,215,546 B2 * | 7/2012 | Lin et al. | | 235/382 |
| 8,681,368 B2 * | 3/2014 | Hohensee et al. | | 358/1.16 |
| 8,847,739 B2 * | 9/2014 | Wilson et al. | | 340/10.52 |
| 2006/0212164 A1 | 9/2006 | Abraham, Jr. et al. | | |

(Continued)

OTHER PUBLICATIONS

International Search Report and Written Opinion dated Apr. 1, 2015 for International Application No. PCT/US2014/072482.

*Primary Examiner* — Negussie Worku
(74) *Attorney, Agent, or Firm* — Avery Dennison Retail Information Services, LLC (57) ABSTRACT

A system for automated RFID printing and integration is disclosed. The system includes an automated digital RFID printer utilized in combination with server system from a client/server system. The system also includes a corresponding method for automated RFID printing and integration as well as a non-transitory computer storage media having instructions stored thereon which, when executed, execute a method for automated RFID printing and integration.

34 Claims, 6 Drawing Sheets

(56) References Cited

U.S. PATENT DOCUMENTS

| | | | |
|---|---|---|---|
| 2007/0018785 A1* | 1/2007 | Chi | 340/5.2 |
| 2007/0210923 A1* | 9/2007 | Butler et al. | 340/572.8 |
| 2010/0171594 A1* | 7/2010 | Bares et al. | 340/10.2 |
| 2012/0206243 A1* | 8/2012 | Butler et al. | 340/10.51 |
| 2014/0292490 A1* | 10/2014 | Butler et al. | 340/10.1 |
| 2015/0129666 A1* | 5/2015 | Butler et al. | 235/492 |
| 2015/0324681 A1* | 11/2015 | Mats et al. | |

* cited by examiner

SYSTEM AND METHOD FOR AUTOMATED DIGITAL RFID PRINTING AND INTEGRATION

CROSS-REFERENCE TO RELATED APPLICATION(S)

The present application claims priority from U.S. Provisional Application No. 61/939,379 filed Feb. 13, 2014, which is incorporated by herein by reference in its entirety.

BACKGROUND OF THE INVENTION

Current RFID printing is limited to thermal production. Digital printing may enable more materials, colors and shapes and may reduce costs associated with base roll inventory. No methods or systems currently exist to existing processing of digital radio frequency identification or digital RFID files. Options for delivering a solution are based on an initial proof of concept that utilized Inspire Designer software for workflow automation. The solution may leverage work done for a global print management or GPM project or more specifically, the global print management particle swarm optimization or GPM PSO workflow module.

SUMMARY OF THE INVENTION

In one exemplary embodiment, a system and method for automated RFID printing and integration with ancillary systems is provided. The method and system may include the functional requirements related to global print management or GPM and RFID. The method and system assumes reuse, where possible, of existing work prepared for a GPM project. Additionally the system and method allow for the automation of portable document format or PDF files for digital RFID printing and the required integration with ancillary systems supporting a production workflow.

BRIEF DESCRIPTION OF THE DRAWINGS

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Aspects of the present invention are disclosed in the following description and related figures directed to specific embodiments of the invention. Those skilled in the art will recognize that alternate embodiments can be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration". The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage media such that execution of the sequence of actions enables the processor to perform the functionality described herein. Thus, the various aspects of the present invention can be embodied in a number of different forms, all of which have been contemplated to be within the scope of the claimed subject matter. In addition, for each of the embodiments described herein, the corresponding form of any such embodiments can be described herein as, for example, "a computer configured to" perform the described action.

Further, as used herein, terms such as slice, picture and frame may be utilized interchangeably, even in situations where a frame or picture may be coded with multiple slices and/or slices of different types. Additionally, the term picture may be interpreted as a generic term that could define either a frame or a field.

Equipment may be one or more digital offset printing presses, an encoder and Hewlett Packard or HP designed for the environment DFE. The digital offset printing presses may be any digital offset printing presses that are known in the art but are typically one or digital offset printing presses utilized in combination with a client server system. The encoder may be a device, circuit, transducer, non-transitory storage media program, algorithm or person that converts information from one format or code to another, for the purposes of standardization, speed, secrecy, security or compressions. The term asset may refer to artwork and the like.

Figure 1:
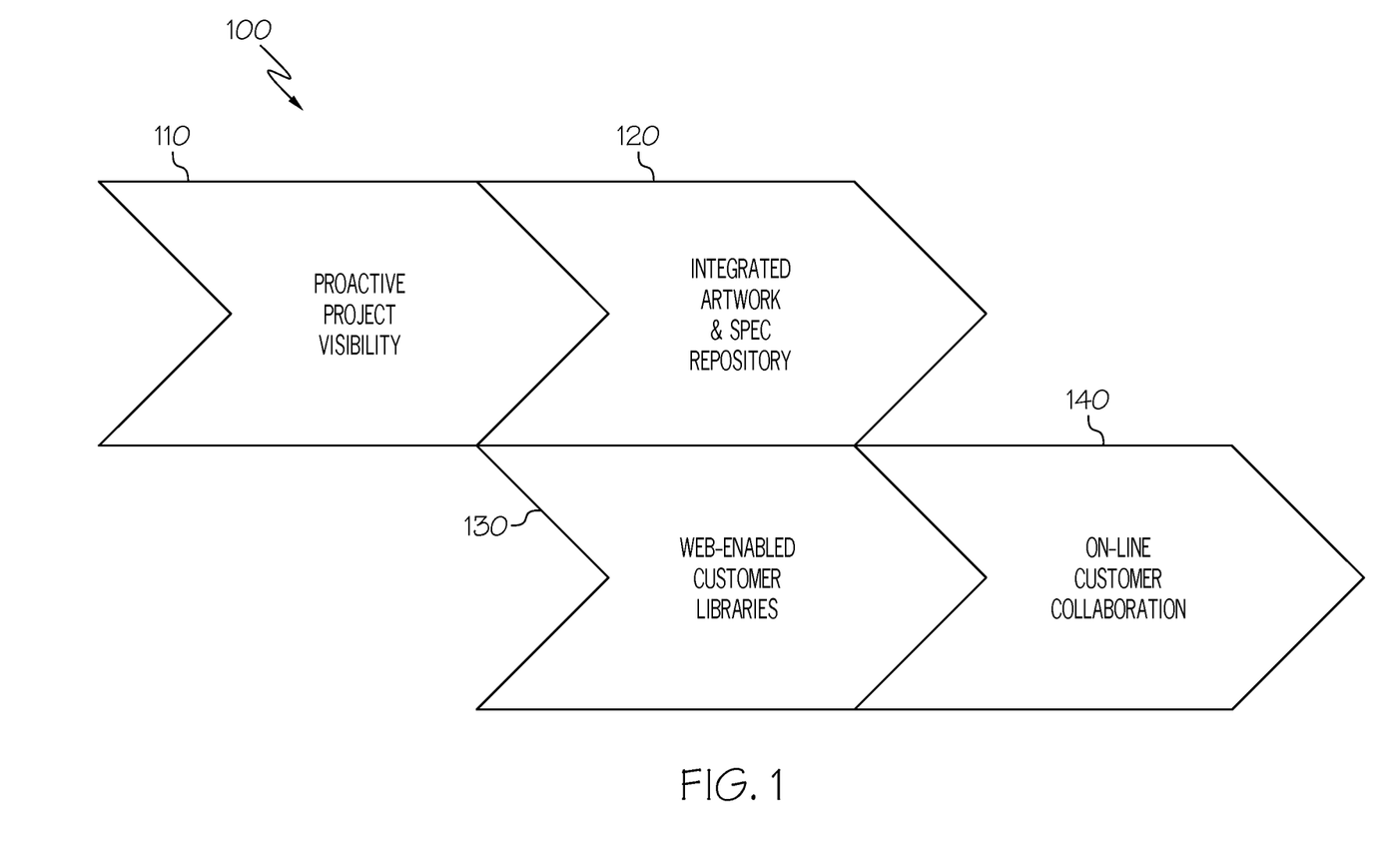
FIG. 1 is an exemplary diagram showing the system and method for automated RFID printing and integration with ancillary systems benefits.

FIG. 1 is an exemplary diagram showing system and method for automated RFID printing and integration with ancillary systems benefits. The system and method benefits 100 may include proactive project visibility 110, an integrated artwork and spec repository 120, one or more web-enabled customer libraries 130 and online customer collaboration 140.

Figure 2:
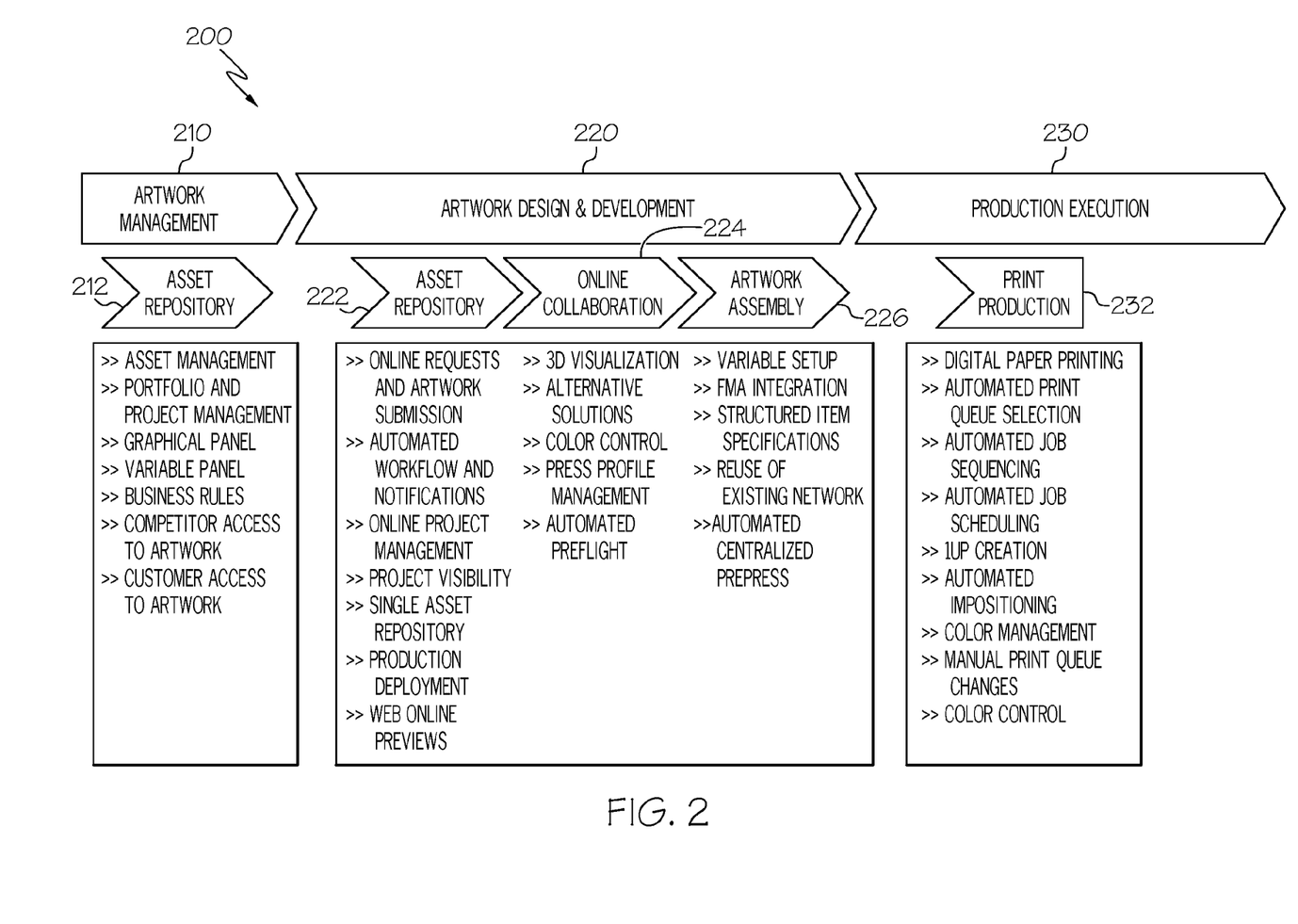
FIG. 2 is an exemplary diagram showing system and method for automated RFID printing and integration with ancillary systems implementation benefits.

FIG. 2 is an exemplary diagram showing a system and method for automated RFID printing and integration with ancillary systems implementation benefits. The system and method implementation benefits 200 may include artwork management 210, artwork design and development 220 and production execution 230. The artwork management 210 may include an asset repository 212. The asset repository 212 may perform asset management, portfolio and project management, include a graphic panel, a variable panel and one or more business rules, have competitor access to artwork and customer access to artwork. The artwork design and development 220 may include an asset repository 222, an online collaboration 224 and an artwork assembly 226. The asset repository 222 may include one or more online requests and artwork submission, one or more automated workflow and notifications, online project management, project visibility, a single asset repository, production deployment and one or more online previews. The online collaboration 224 may include three-dimensional visualization, one or more alternative solutions, color control, press profile management and automated preflight. The artwork assembly 226 may include a variables set-up, FMA integration, one or more structured item specifications, reuse of existing artwork and automated centralized prepress. The production execution 230 may include print production 232. The print production 232 may include digital paper printing, automated print queue selection, automated job scheduling, one-up creation, automated impositioning, color management, manual print queue changes and color control.

Figure 3:
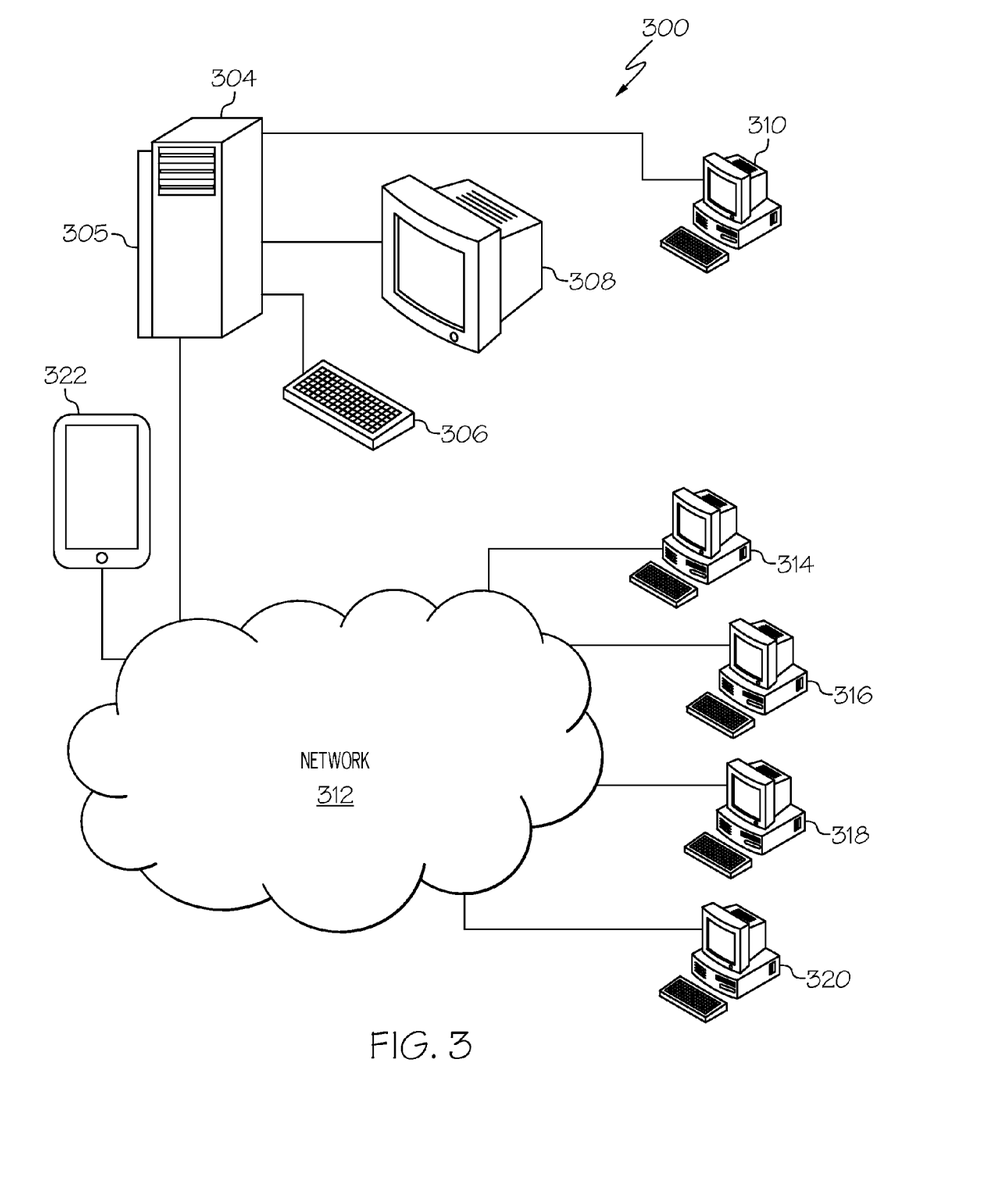
FIG. 3 is an exemplary diagram showing a system for automated RFID printing and integration.

FIG. 3 is an exemplary diagram showing a system 300 for automated RFID printing and integration. The system 300 includes a server system 304, an input system 306, an output system 308, a plurality of client systems 310, 314, 316, 318 and 320, a communications network 312 and a hand-held device 322. In other embodiments, the system 300 may include additional components and/or may not include all of the components listed above.

The server system 304 may include one or more servers. One server 304 may be the property of the distributor of any related non-transitory storage media. In other embodiments, the system 300 may include additional components and/or may not include all of the components listed above. The server system 304 may be utilized in combination with an automated digital RFID printer 305.

The input system 306 may be utilized for entering input into the server system 304, and may include any one of, some of, any combination of, or all of a keyboard system, a mouse system, a track ball system, a track pad system, a plurality of buttons on a handheld system, a scanner system, a wireless receiver, a microphone system, a connection to a sound system, and/or a connection and/or an interface system to a computer system, an intranet, and/or the Internet (e.g., IrDA, USB), for example.

The output system 308 may be utilized for receiving output from the server system 304, and may include any one of, some of, any combination of or all of a monitor system, a wireless transmitter, a handheld display system, a printer system, a speaker system, a connection or an interface system to a sound system, an interface system to one or more peripheral devices and/or a connection and/or an interface system to a computer system, an intranet, and/or the Internet, for example.

The system 300 illustrates some of the variations of the manners of connecting to the server system 304, which may be an information providing website (not shown). The server system 304 may be directly connected and/or wirelessly connected to the client systems 310, 314, 316, 318 and 320 and are connected via the communications network 312. The communications network 312 may be any one of, or any combination of, one or more local area networks or LANs, wide area networks or WANs, wireless networks, telephone networks, the Internet and/or other networks. The communications network 312 may include one or more wireless portals. The client systems 310, 314, 316, 318 and 320 may be any system that an end user may use to access the server system 304. For example, the client systems 310, 314, 316, 318 and 320 may be personal computers, workstations, laptop computers, game consoles, handheld network enabled audio/video players and/or any other network appliance.

The client system 320 may access the server system 304 via the combination of the communications network 312 and another system. The client system 320 is an example of a handheld wireless device 322, such as a mobile phone with an operating system or SMARTPHONE® or a handheld network enabled audio/music player, which may also be utilized for accessing network content.

Figure 4:
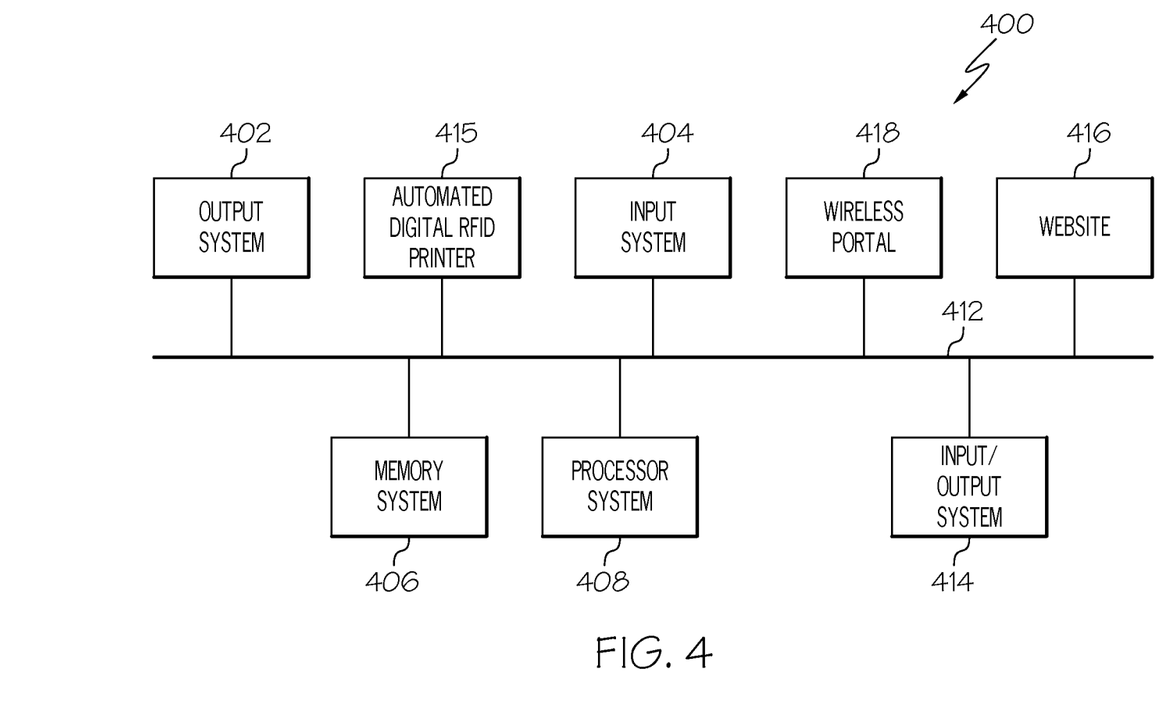
FIG. 4 is an exemplary diagram showing a block diagram of a client system.

FIG. 4 illustrates an exemplary block diagram of a client system 400. The client system 400 may include an output system 402, an input system 404, a memory system 406, a processor system 408, a communications system 412, an input/output system 414, a website 416, a wireless portal 418 and an automated digital RFID printer 415. Other embodiments of the client system 400 may not have all of the components and/or may have other embodiments in addition to or instead of the components listed above.

The client system 400 may be any one of the client systems 410, 414, 416, 418, 420, and/or handheld wireless device 122 that may be utilized as one of the network devices of FIG. 3. In other embodiments, the client system 400 may include additional components and/or may not include all of the components listed above. The output system 402 may include any one of, some of, any combination of or all of a monitor system, a wireless transmitter, a handheld display system, a printer system, a speaker system, a connection or interface system to a sound system, an interface system to peripheral devices and/or a connection and/or an interface system to a computer system, an intranet, and/or the Internet, for example.

The input system 404 may include any one of, some of, any combination of or all of a keyboard system, a mouse system, a track ball system, a track pad system, one or more buttons on a handheld system, a scanner system, a wireless receiver, a microphone system, a connection to a sound system, and/or a connection and/or an interface system to a computer system, an intranet, and/or the Internet (e.g., Infrared Data Association or IrDA, Universal Serial Bus or USB), for example. The memory system 406 may include, for example, any one of, some of, any combination of or all of a long term storage system, such as a hard drive, a short term storage system, such as a random access memory; a removable storage system, such as a floppy drive or a removable drive, and/or a flash memory. The memory system 406 may include one or more machine readable mediums that may store a variety of different types of information. The term machine readable medium may be utilized to refer to any medium that may be structurally configured for carrying information in a format that may be readable by a machine. One example of a machine-readable medium may be a computer-readable medium. The memory system 406 may also store an application for automated RFID printing and integration.

The processor system 408 may include any one of, some of, any combination of, or all of multiple parallel processors, a single processor, a system of processors having one or more central processors and/or one or more specialized processors dedicated to specific tasks. The processor system 408 implements the programs stored in the memory system 406. The communications system 412 communicatively links the output system 402, the input system 404, the memory system 406, the processor system 408, and/or the input/output system 414 to each other. The communications system 412 may include any one of, some of, any combination of, or all of one or more electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

The input/output system 414 may include devices that have the dual function as input and output devices. For example, the input/output system 414 may include one or more touch sensitive screens, which display an image and therefore are an output device and accept input when the screens are pressed by a finger or a stylus, for example. The touch sensitive screens may be sensitive to heat, capacitance and/or pressure. One or more of the input/output devices may be sensitive to a voltage or a current produced by a stylus, for example. The input/output system 414 may be optional, and may be utilized in addition to or in place of the output system 402 and/or the input device 404.

The client systems 310, 314, 316, 318, 320 and the handheld wireless device 322 may also be tied into a website 416 or a wireless portal 418 which may be also tied directly into the communications system 412. Any website 416 or wireless portal 418 would also include non-transitory storage media and a website module (no number) to maintain, allow access to and run the website as well.

Figure 5:
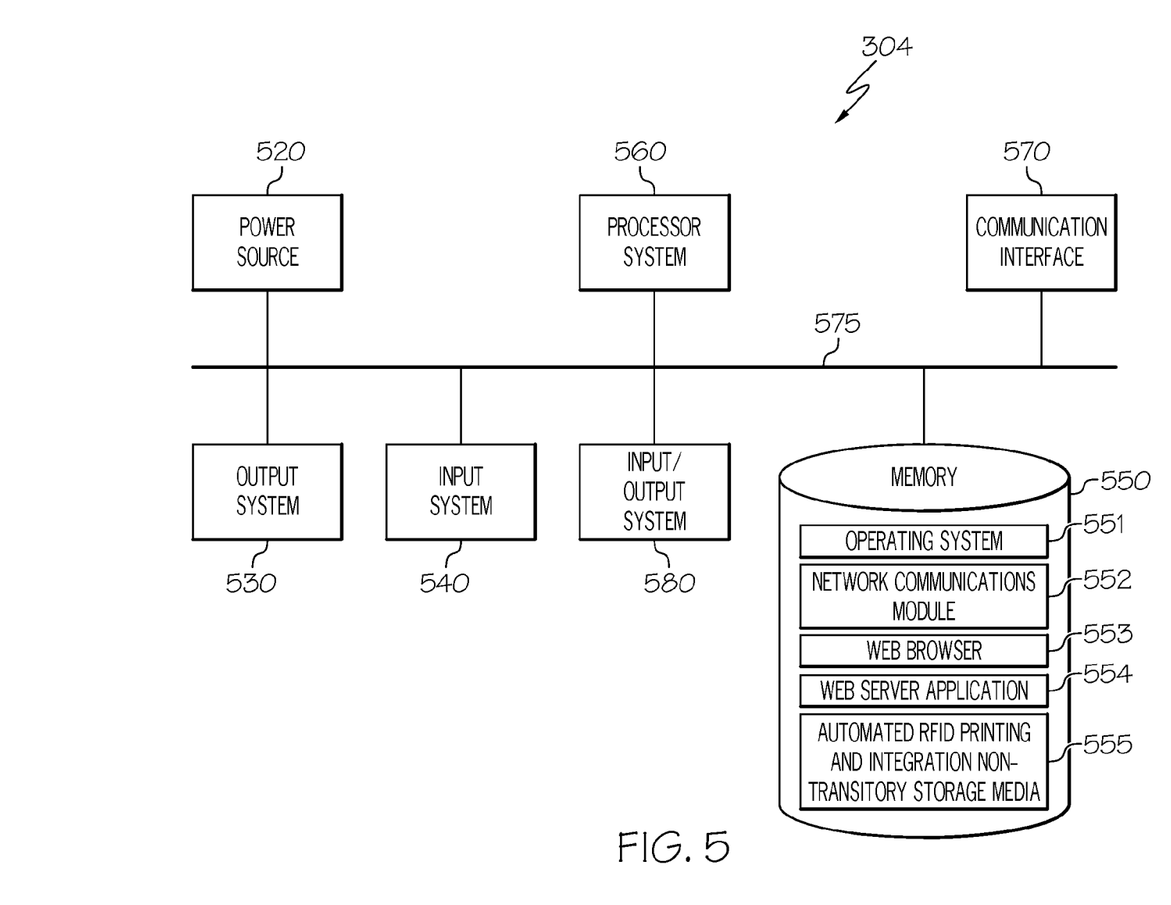
FIG. 5 is an exemplary diagram showing a block diagram of a server system.

FIG. 5 illustrates a block diagram of a server system 304. The server system 304 may include a power source 520, an output system 530, an input system 540, a memory system 550, which may store an operating system 551, a communications module 552, a web browser module 553, a web server application 554 and an automated RFID printing and integration non-transitory storage media 555. The server system 304 may also include a processor system 560, a communications interface 570, a communications system 575 and an input/output system 580. In other embodiments, the server system 304 may include additional components and/or may not include all of the components listed above.

The output system 530 may include any one of, some of, any combination of, or all of a monitor system, a handheld display system, a printer system, a speaker system, a connection or interface system to a sound system, an interface system to one or more peripheral devices and/or a connection and/or interface system to a computer system, an intranet, and/or the Internet, for example.

The input system 540 may include any one of, some of, any combination of, or all of a keyboard system, a mouse system, a track ball system, a track pad system, one or more buttons on a handheld system, a scanner system, a microphone system, a connection to a sound system, and/or a connection and/or an interface system to a computer system, an intranet, and/or the Internet (e.g., IrDA, USB), for example.

The memory system 550 may include, for example, any one of, some of, any combination of, or all of a long term storage system, such as a hard drive; a short term storage system, such as random access memory; a removable storage system, such as a floppy drive or a removable drive and/or a flash memory. The memory system 550 may include one or more machine readable mediums that may store a variety of different types of information. The term machine readable medium may be utilized to refer to any medium capable of carrying information that may be readable by a machine. One example of a machine-readable medium may be a computer-readable medium. The memory system 550 may store one or more machine instructions for automated RFID printing and integration. The operating system 551 controls all non-transitory storage media and hardware of the system 300. The communications module 552 enables the server system 304 to communicate on the communications network 312. The web browser module 553 allows for browsing the Internet. The web server application 554 serves a plurality of web pages to client systems that request the web pages, thereby facilitating browsing on the Internet.

The automated RFID printing and integration non-transitory storage media 555 may utilize a plurality of different automated RFID printing and integration non-transitory storage media 555. A first non-transitory storage media may be GMC Inspire Designer that may be designed for both business and technical users and may be utilized by marketing, graphic arts, business, operations and IT professionals, providing an integrated development environment. GMC Inspire Designer may be an intuitive graphical user interface or GUI that may expose only the appropriate tools and level of complexity to the user based on the work performing. Designer may offer market-leading variable template design capabilities, enterprise-class data connection and transformation capabilities and powerful post-composition control. Real-time, what you see is what you get or WYSIWYG proofing may allow users to quickly and easily see the effect of changes to both template and data logic, with the confidence that testing may be a pixel-accurate view of what would be produced. Workflow wizards may assist users in the completion of common tasks. Designer supports the import of page layouts from Adobe InDesign, Quark, PDF, RTF, Microsoft .DOCX and other graphic file formats. Designer also offers a broad set of data connection and transformation tools. With a flexible user interface ranging from simple point-and-click tools to a powerful scripting language, Designer applications may be capable of connecting to numerous structured and unstructured file formats. Data output capabilities have similar depth, including XML, delimited, and customized formats. Testing and review capabilities within Designer include the ability to interactively step through variable records and pages at any point in the application, trace data values to their source and usage, and the ability to synchronize data and page proofing views to verify template logic. Designer applications may also use a set of powerful post-composition imposition tools to create final production pieces. The applications created in Designer may contain all of the data and variable document template logic and are saved to version-controlled storage in .WFD (GMC Workflow Documents) or XML format. In addition, GMC Designer's self-referential capability may allow the creation of reusable data and document components which enables users to achieve their speed to market, delivery and consistency objectives. Designer runs on both Windows and Mac, with full cross-compatibility between operating systems. Templates and applications that used to take approximately weeks or even months to develop may be finished in approximately a few days or sometimes just hours. Ease-of-use and agility shorten traditionally lengthy development times, so users may be less dependent on programmers or IT resources, even while increasing product capability and relevance.

A second non-transitory storage media may be GMC Inspire Content Manager that may be a unified hub for presentation, versioning, control and distribution of digital assets and of the product applications created with Designer. Content Manager may maintain accurate, accessible records of document revisions and updates and may help users more effectively manage job flow and product integrity. Automatic change/version management, assets metadata and taxonomy management, file permission access and security, document layout comparisons and collaborative work permission and tracking are just a few of the features. Content Manager may present assets and metadata to users via both standalone interfaces (desktop and browser), and from within Designer and Interactive. Users may choose the specific version of a product, image, font, component or application and use that asset within the solution. There may be a browser-based extension of Content Manager which provides the ability for users to browse and add digital assets through the web. Content Manager may operate in local, intranet, and Internet environments. This may allow collaboration across the full spectrum of local and remote users. Content Manager also may integrate with various securities administration frameworks including Active Directory/LDAP.

A third non-transitory storage media may be GMC Inspire Production Server that may be a run-time output engine for the system and method. Production Server may be a high performance multi-threaded application that may be run as a service or as standalone executable (or both). Production Server may interpret GMC .WFD applications and generates output in multiple formats (PPML, PDF, etc.) and to multiple channels (email, web, mobile, etc.). This capability positions a user future product output needs. Production Server may also be invoked for real-time, interactive composition via GMC Connect. Production Server supports industry standard output protocols for a multitude of print-ready output formats which may enable a user to optimize the process of bundling and submitting work to external print vendors. Most print service providers, especially those focused on ADF or Automated Document Factory workflows, may center their processes around the AFP or PDF format. Capable of enterprise-class throughput and easily scalable, Production Server may achieve output in the range of approximately 50,000 to 100, 000 pages per minute per CPU. Licensed by CPU (regardless of the number of CPU "cores"), this positions users for future growth and allows easy horizontal and vertical scalability at a lower cost and higher return on investment or ROI.

A third non-transitory storage media may be GMC Inspire Automation. GMC Automation may be a highly flexible and configurable non-transitory storage media solution for centralized, enterprise-wide composition process automation. Automation may process and route application data streams to one or more appropriate outputs, while the non-transitory storage media's high performance and processing speed help operations achieve maximum throughput. Based on state-of-the-art object-oriented design, automation provides a robust architectural framework of unmatched scope and flexibility. Its backbone may be incorporated into existing non-transitory storage media environments to control local and remote GMC and non-GMC applications.

A fourth non-transitory storage media may be GMC Inspire Connect. GMC Connect extends the framework's integration capability by providing a SOAP and MQ-compliant messaging interface that allows existing a user applications and services to leverage the power of the solution.

A fifth non-transitory storage media may be GMC Inspire Production Planner. Production Planner may be a series of automated decisions utilized to plan the production systems based on orders as they are received. Users may have a graphical interface to analyze jobs production based on their job function.

The processor system 560 may include any one of, some of, any combination of, or all of multiple parallel processors, a single processor, a system of processors having one or more central processors and/or one or more specialized processors dedicated to specific tasks. The processor system 560 may implement the machine instructions stored in the memory system 550.

In an alternative embodiment, the communication interface 570 allows the server system 304 to interface with the network 312. In this embodiment, the output system 530 sends communications to the communication interface 570. The communications system 575 communicatively links the output system 530, the input system 540, the memory system 550, the processor system 560 and/or the input/output system 580 to each other. The communications system 575 may include any one of, some of, any combination of, or all of one or more electrical cables, fiber optic cables, and/or sending signals through air or water (e.g. wireless communications), or the like. Some examples of sending signals through air and/or water include systems for transmitting electromagnetic waves such as infrared and/or radio waves and/or systems for sending sound waves.

The input/output system 580 may include devices that have the dual function as the input and output devices. For example, the input/output system 580 may include one or more touch sensitive screens, which display an image and therefore are an output device and accept input when the screens are pressed by a finger or a stylus, for example. The touch sensitive screens may be sensitive to heat and/or pressure. One or more of the input/output devices may be sensitive to a voltage or a current produced by a stylus, for example. The input/output system 580 may be optional and may be utilized in addition to or in place of the output system 530 and/or the input device 540.

The proposed system may utilize a platform of modular capabilities to provide a unified environment for creation, deployment and maintenance. Using non-transitory storage media such as GMC Inspire Designer, Inspire Automation, Inspire Content Manager and Inspire Connect, a solution to maximize efficiency in the printing/encoding process may be provided. The solution may leverage GMC PSO and workflows developed for the GPM project.

Figure 6:
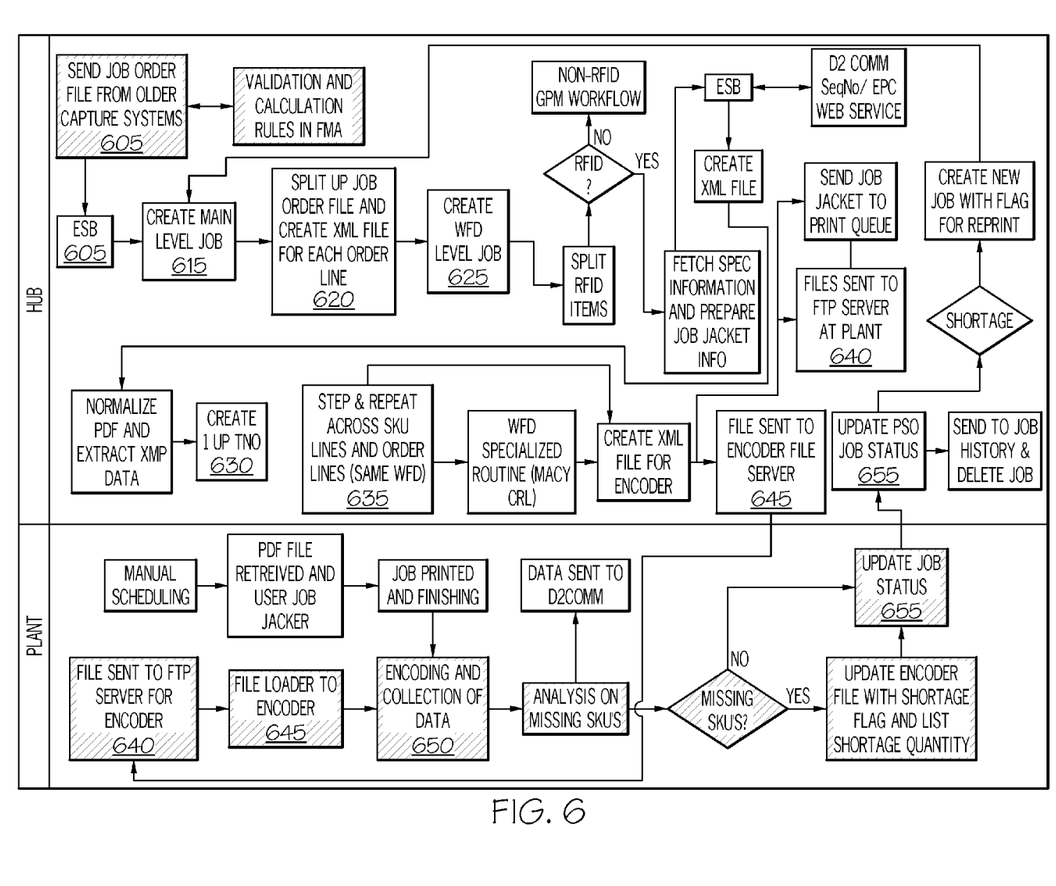
FIG. 6 is an exemplary diagram showing a method for automated RFID printing and integration with ancillary systems.

FIG. 6 is an exemplary diagram showing a method 600 for automated RFID printing and integration with ancillary systems. The method 600 steps may include sending a job order from an order capture system 605, utilizing an enterprise service bus 610, creating a main level job 615, splitting-up job order file and create an extensible mark-up language XML file for each order line 620, creating a work file definition level job 625, creating a one up TNO file 630, stepping and repeating across one or more stock keeping unit lines and order lines of same work file definition 635, sending a plurality of files to local file PDF server 640, sending the file to an encoder file server 645, an encoder confirming if all SKU's required to deliver are available 650 and updating job status 655.

The sending a job order step 605 may include at the Hub level, starting the digital production work. Orders may be accepted from the Avery Dennison Enterprise Service Bus or ESB. Current order capturing systems, TRIM, VIPS and Phoenix may communicate with the ESB when an order may be placed. ESB may communicate with Avery Dennison's FMA system to verify the data of the order. If validation fails an error notification may be sent and all processing may be halted. The back end system may release the order again after the correction may be made. New requirements may be added to maintain a lookup table of GLIDS and SPOKES so it may be understood which production flow to use. By adding to the workflow the need for the back end systems to create another device to handle RFID may be eliminated.

The utilizing an enterprise service bus step 610 may include once an order is approved and accepted for printing the ESB system may release an XML data file into a hot folder marked for Digital RFID processing. The contents of the XML file may include all of the order data and any new fields added by FMA. The format of the file may match the current production level file structure released by FMA during testing for that item.

The creating a main level job step 615 may include a job is created and the order file may be copied into the job. Every job in the automation system contains attributes about the job. Several attributes may be set based on data in the order file. This information may be utilized to control the production processes later in the system.

The splitting-up job order file and create an extensible mark-up language XML file for each order line step 620 may include that every order file or job may contain orders for several items at once. The original order may be split into individual data files based on the item inside the original order according to business processes. For example, "Color By Size" items may be treated as one job only. This is done by comparing the WFD for each line within the order. Although order lines and SKU's may be combined for printing, the workflow must maintain information on the original order lines and SKU's for reprints and for feeds to the encoder.

The creating a work file definition level job step 625 may be based on the new item's data files. Individual jobs for each WFD (which could be multiple order lines, SKU's if the same WFD is present) may be generated. These jobs may contain reference information from the parent order job. Items to be built or processed are allowed in parallel which in turn allows for faster processing of orders. Prior to finalizing quantity count the system must add a predefined percentage for scrap to the required quantity. The overrun may be a global percentage by quantity range applied at the SKU level. The creating a work file definition level job step 625 may also have all communication to D2Comm utilizing IBM's Message Queue. A JSON object for communicating with D2Comm may be utilized. The RFID work flow may require a call to the D2Comm solution to request individual EPC codes for each SKU. Work flow processing may be held until the return of the information. The message to D2Comm may include jobID, global RBO Code, program, location ID, PO number, order and line ID, date requested, time requested and quantity per order line. Further discussion needed on machine as this model does not include press assignment. Response may include at least: job number, actual serial numbers, and date responded, time responded values, and possibly a message ID. All order/line info for a job may be for the same RBO+ program name. D2Comm may read the incoming message and return the required information. All EPC codes for the job may be returned in one message. Receipt of the serialization message may trigger continuance of the workflow.

The creating one up TNO step 630 may include creating single-up examples of every SKU for that item. For example, a SKU would be all the information about a single ticket (i.e., size, color, cost). Therefore a SKU for a large size item would be different than a SKU for a medium size item. These single-up examples may be generated into a TNO file. A TNO file may be a production or print format that may have several advantages. One advantage may be that images that are utilized on all SKUs of an item may only be placed in the print file once. This results in smaller files that may need to be transmitted to the SPOKES which mean lower costs for data transfer and for quicker processing. Another advantage of the TNO file format is that TNOs may be turned into any print stream in the SPOKE. This means that work may be easily transferred between printing technologies at the last moment to facilitate disaster recovery quickly. One PDF for each SKU based on TNO file that was created may be generated. Once all of the PDF files are created a JDF file may be created. The JDF content and timing may need to be reviewed and not repeat EA. The JDF may be a text file that may contain all of the steps and information necessary for EA to normalize the file.

The stepping and repeating across one or more stock keeping unit lines and order lines of the same work file definition step 635 may include after receiving the milestone XML marker and JDF files for each unique arrangement, PDFs may be generated. The PDFs may be delivered to a folder for subsequent deliver to a local FTP server. As with current processing, metadata may be examined and color bars may be added to the step and repeat sheet. Current output may include both the PDF style and the JDF instructions. Instructions may be utilized for color management and to pass the number sheet count required to the digital press. Two options may be under consideration. The options may impact the requirements for the one up file and the repeat process. The first option may be a one up file created for each specific SKU with the field that defines the uniqueness at the each level (i.e., the CRL data for Macy's orders). This may require defining a specific attribute within the WFD. Each unique SKU PDF may be normalized and the unique images may be placed in the step and repeat process. The second option may be a one up file created for each SKU less the field that makes a unique tag, (i.e., the Macy CRL). This may require defining a specific attribute within the WFD. The step and repeat process may be performed and apply the specific unique variable during the step and repeat process. The second option may be a desired process.

The sending PDF file to local file server step 640 may also apply to JMF and JDF files.

The sending the file to an encoder file server step 645 may include preparing a file for the encoder. The file may contain information to identify the job, the order line, and each unique SKU.

The encoder confirming if all SKU's required to ship are now available step 650 may include at the completion of all SKU's in the job the encoder may confirm if all SKU's required to ship are now available. When the analysis may be complete the encoder may return a message indicating the status and confirming if additional reprints are required.

The update job status step 655 may include updating the status of the job depending on the content of the message. If all SKU's have been printed the status may change to complete. If more SKU's are required the job may be complete but a new job for the missing SKU's may be required. A new link may be created but needs to identify that the job may be a reprint job. As a planner may not be utilized, the print due date may be the original due date. It is important that the job be flagged as a reprint and that information be printed on the job jacket. Once the job may be completed the workflow returns to the creating a main level job step 615.

The method manages automated workflow driving RFID print ready files for the digital platform and electronic product code encoding or EPC. Particle swarm optimization or PSO workflow provides a tool to manage the process. The PSO workflow may integrate with order management systems to capture order details, with D2Comm to retrieve the required EPC information and with the encoder solution to pass information critical to enabling the EPC commissioning process and to manage reprint requests.

The method may allow providing RFID tags utilizing options not possible with thermal printing and may reduce costs. The shortened time for digital production may allow for flexibility in sourcing decisions. High volume printing with sequential numbering and RFID digital print may allow for new market needs and new revenue opportunities.

High level requirements may include integration with legacy systems TRIM, VIPS and Phoenix to process incoming RFID orders utilizing GPM defined structure, ability to distinguish items, by location and production method, to be processed through GPM or RFID solution, validation of orders, as required, with format manager admin or FMA, transformation of incoming order lines to jobs and sub-jobs handling multiple lines and/or SKUs per order, ability to define overrun percentage to each SKU line by predetermined global quantity ranges, communication with D2Comm to request and receive EPC encryption information through a message broker as a json object, preparation of a normalized one-up PDF with technical inks removed if possible, preparation of step and repeat files for digital printing combing order line SKU's with the same work flow definition (same print format) and within the same order (not across orders), preparation of step and repeat files with uniqueness at the each level (i.e. Macy's CRL), preparation of step and repeat files without header tickets, preparation of step and repeat utilizing standard templates (sheet size and SKU size) assigned to the item and ability to associate a template with a GLID. Additional high level requirements may include color bars applied to each prepared print sheet based on the template, ability to define the fields that need to be sent to the encoder and/or D2Comm, communication with encoder to deliver information, (i.e., job, order, line, SKU information, etc.) supporting both encoding and requests for reprints, communication with encoder to receive detailed information on reprints, communication with encoder to receive status information on job completion, ability to create reprint jobs and trigger start of print workflow from EPC call to D2Comm forward, error handling to identify jobs that were not processed, ability to create reprint jobs without request from encoder, ability to flag job as reprint and print reprint on S&R, identify by production location the file transfer protocol or FTP credentials to use for both PDF files and encoders, ability to store FTP and encoder FTP information by production location, create job jacket (modified version due to multiple order lines), ability to set print queue for job jackets at a plant location level, functionality introduced for RFID that is not in current GPM method and PSO Hub Processing not included in RFID workflow.

Current RFID printing may be limited to thermal production. Digital printing may enable more materials, colors and shapes and may reduce costs associated with base roll inventory. The method may also allow for a collapsed design through print cycles. The system and method may print faster with consistent quality and improved data accuracy globally. The system and method may impact multiple roles in the digital print process from design through printing.

Artwork preparation may be done utilizing the system and method. WebCenter, all CPD, production artists, and GSPD resources involved with RFID designs may be trained on the system and method. Format automation resources must be trained to use the system and method to develop print formats, now identified as work flow definitions or WFD. Prepress and Planning procedures may be altered as the print ready files may now be delivered to a new source. The print files delivered may have technical inks stripped automatically during the one up process eliminating a current process step. Scheduling may use a new reprint module within the encoder solution to request additional PDF sheets for printing. Users may participate in the test case definition and the execution of the user acceptance testing or UAT prior to production launch. Business process owners may be responsible for updating and/or creating standard operating procedures supporting the digital RFID process.

Assumptions regarding the system and method may include internal art design, order management interface per new design for the GPM solution, RFID jobs may be processed on the HUB only. with no SPOKE solution that may be available, order management systems include TRIM, VIPS and Phoenix only and Step and repeat may include multiple SKU's and order lines with a common WFD.

Constraints regarding the system and method may include manually scheduling of digital RFID jobs required as the production planner module of GMC may not be implemented, initial implementation may not include a GPM color management module, feeds from any additional systems may require an interface be built per the standard specification of GPM and RFID items that are all assumed to have variable data and additional processing may be required for stock items that have any other type of serialization (i.e., security).

Online and/or batch timing requirements to be imposed on the system may include response time from receipt of input data to availability of system products, response time to queries and updates, sequential relationship of functions, priorities imposed by types of input and changes in modes of operation and any deviations from specified response times for peak load periods or contingency operations, as applicable.

Batch and online inputs and outputs may include interfaces to other systems, order management systems sending of order data, d2comm encryption data and encoder status and reprint information.

Other aspects of the invention may include known methods of data transmission and Internet-related activities. Still other aspects of the invention may utilize wireless data transmission and the like.

The foregoing description and accompanying figures illustrate the principles, one or more embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments may be made by those skilled in the art without departing from the scope of the invention as defined by the following claims.

What is claimed is:

1. A method for automated RFID printing and integration, comprising the steps of: providing a server system with a processor system, a communications interface, a communications system, an input system and an output system, the server system having access to a communications network;
  providing a memory system with an operating system, a communications module, a web browser module, a web server application and an automated RFID printing and integration non-transitory storage media;
providing an automated digital RFID printer utilized in combination with the server system;
  sending a job order from an order capture system;
  utilizing an enterprise service bus;
  creating a main level job;
  splitting-up a job order file and creating an extensible mark-up language XML file for each order line;
  creating a work file definition level job;
  creating a one up TNO file;
  stepping and repeating across one or more stock keeping unit lines and order lines of same work file definition;
  sending a plurality of files to local file PDF server;
  sending the files to an encoder file server;
  an encoder confirming if all SKU's required to deliver are available; and
  updating job status.

2. The method for automated RFID printing and integration according to claim 1, wherein the method further comprises providing a client system.

3. The method for automated RFID printing and integration according to claim 2, wherein the client system includes an output system, an input system, a memory system, a processor system and a communications system.

4. The method for automated RFID printing and integration according to claim 3, wherein the client system is a handheld wireless device.

5. The method for automated RFID printing and integration according to claim 4, wherein the client system is a mobile phone with an operating system.

6. The method for automated RFID printing and integration according to claim 3, wherein the client system is a personal computer.

7. The method for automated RFID printing and integration according to claim 3, wherein the client system accesses the server system via the communications network.

8. The method for automated RFID printing and integration according to claim 1, wherein the communications network is the Internet or a wide area network.

9. The method for automated RFID printing and integration according to claim 1, wherein the communications network is a mobile phone with an operating system network.

10. The method for automated RFID printing and integration according to claim 1, wherein the automated RFID printing and integration non-transitory storage media is designed for business and technical users and is utilized by marketing, graphic arts, business, operations and IT professionals.

11. The method for automated RFID printing and integration according to claim 10, wherein the automated RFID printing and integration non-transitory storage media provides an integrated development environment.

12. The method for automated RFID printing and integration according to claim 11, wherein the automated RFID printing and integration non-transitory storage media is an intuitive graphical user interface.

13. The method for automated RFID printing and integration according to claim 1, wherein the automated RFID printing and integration non-transitory storage media is a unified hub for presentation, versioning, control and distribution of digital assets and of a plurality of product applications.

14. The method for automated RFID printing and integration according to claim 13, wherein the automated RFID printing and integration non-transitory storage media maintains accurate, accessible records of document revisions and updates and more effectively manage job flow and product integrity.

15. The method for automated RFID printing and integration according to claim 1, wherein the automated RFID printing and integration non-transitory storage media is a run-time output engine.

16. The method for automated RFID printing and integration according to claim 15, wherein the automated RFID printing and integration non-transitory storage media is a run-time output engine that interprets a plurality of GMC WFD applications and generates output in multiple formats to multiple channels.

17. The method for automated RFID printing and integration according to claim 1, wherein the automated RFID printing and integration non-transitory storage media is a flexible and configurable non-transitory storage media solution for centralized, enterprise-wide composition process automation.

18. The method for automated RFID printing and integration according to claim 17, wherein the automated RFID printing and integration non-transitory storage media processes and routes application data streams to one or more appropriate outputs.

19. The method for automated RFID printing and integration according to claim 1, wherein the method provides a plurality of RFID tags.

20. The method for automated RFID printing and integration according to claim 1, wherein the method results in shortened digital production time.

21. The method for automated RFID printing and integration according to claim 20, wherein the shortened digital production time allows flexibility in sourcing decisions.

22. The method for automated RFID printing and integration according to claim 1, wherein the method results in high volume printing with sequential numbering.

23. The method for automated RFID printing and integration according to claim 1, wherein the method results in faster printing with consistent quality and improved data accuracy.

24. The method for automated RFID printing and integration according to claim 1, wherein the method for automated RFID printing and integration provides a plurality of RFID tags.

25. The method for automated RFID printing and integration according to claim 1, wherein the method for automated RFID printing and integration results in shortened digital production time.

26. The method for automated RFID printing and integration according to claim 25, wherein the shortened digital production time allows flexibility in sourcing decisions.

27. The method for automated RFID printing and integration according to claim 1, wherein the method for automated RFID printing and integration results in high volume printing with sequential numbering.

28. The method for automated RFID printing and integration according to claim 1, wherein the method for automated RFID printing and integration results in faster printing with consistent quality and improved data accuracy.

29. A non-transitory computer storage media having instructions stored thereon which, when executed, execute a method for automated RFID printing an integration comprising the steps of:
  providing a server system with a processor system, a communications interface, a communications system, an input system and an output system, the server system having access to a communications network;
  providing a memory system with an operating system, a communications module, a web browser module, a web server application and an automated RFID printing and integration non-transitory storage media;
  providing an automated digital RFID printer utilized in combination with the server system;
  sending a job order from an order capture system;
  utilizing an enterprise service bus;
  creating a main level job;
  splitting-up a job order file and creating an extensible mark-up language XML file for each order line;
  creating a work file definition level job;
  creating a one up TNO file;
  stepping and repeating across one or more stock keeping unit lines and order lines of same work file definition;
  sending a plurality of files to local file PDF server;
  sending the files to an encoder file server;
  an encoder confirming if all SKU's required to deliver are available; and
  updating job status.

30. The non-transitory computer storage media according to claim 29, wherein the non-transitory computer storage media provides a plurality of RFID tags.

31. The non-transitory computer storage media according to claim 30, wherein the shortened digital production time allows flexibility in sourcing decisions.

32. The non-transitory computer storage media according to claim 31, wherein the shortened digital production time allows flexibility in sourcing decisions results in high volume printing with sequential numbering.

33. The non-transitory computer storage media according to claim 29, wherein the non-transitory computer storage media results in shortened digital production time.

34. The non-transitory computer storage media according to claim 29, wherein the non-transitory computer storage media results in faster printing with consistent quality and improved data accuracy.

\* \* \* \* \*